United States Patent
Grooters et al.

[11] Patent Number: 5,779,278
[45] Date of Patent: Jul. 14, 1998

[54] POP OFF INSERTION INDICATOR FOR METAL QUICK CONNECTORS

[75] Inventors: Thomas Eugene Grooters, Rochester Hills; George Szabo, Ortonville, both of Mich.

[73] Assignees: ITT Automotive, Inc., Auburn Hills, Mich.; ITT Manufacturing Enterprises, Inc., Wilmington, Del.

[21] Appl. No.: 579,185

[22] Filed: Dec. 27, 1995

[51] Int. Cl.$^6$ ........................................ F16L 35/00
[52] U.S. Cl. ............................. 285/93; 285/319
[58] Field of Search ............................. 285/93, 319

[56] References Cited

U.S. PATENT DOCUMENTS

| | | | |
|---|---|---|---|
| 5,152,555 | 10/1992 | Szabo | 285/93 |
| 5,178,424 | 1/1993 | Klinger | 285/319 |
| 5,226,679 | 7/1993 | Klinger | 285/93 |
| 5,228,728 | 7/1993 | McNaughton et al. | 285/93 |
| 5,297,818 | 3/1994 | Klinger | 285/93 |
| 5,342,099 | 8/1994 | Bahner et al. | 285/93 |
| 5,356,181 | 10/1994 | Shirogane et al. | 285/93 |
| 5,425,556 | 6/1995 | Szabo | 285/4 |
| 5,441,313 | 8/1995 | Kalanastny | 285/319 |
| 5,499,848 | 3/1996 | Kujawski | 285/93 |
| 5,518,276 | 5/1996 | Gunderson | 285/93 |
| 5,536,047 | 7/1996 | Detable et al. | 285/93 |

FOREIGN PATENT DOCUMENTS

4027077  11/1994  WIPO ........................ 285/93

*Primary Examiner*—Eric K. Nicholson
*Attorney, Agent, or Firm*—J. Gordon Lewis; Thomas N. Twomey

[57] ABSTRACT

An insertion indicator for a metal quick connector assembly includes an annular base adapted to be releasably received within the mouth of a female connector component's axial bore, such that the male end form of the connector assembly's male component, including an external flange thereon, is insertable through the indicator's base into the axial bore. The indicator further includes two legs projecting both axially and radially-inwardly from its base so as to extend deeper within the female component's axial bore than the "locking" abutment surfaces of a retainer, also disposed within the bore, when the indicator is releasably received therein. Each leg is resiliently radially yieldable so as to permit passage of an external flange or upset bead on the male component through the indicator, whereupon the free end of each leg rebounds to provide an axially-disposed surface with which the indicator may thereafter be operatively ejected through engagement with the male component's upset bead upon slight retraction of the male component from within the bore.

14 Claims, 4 Drawing Sheets

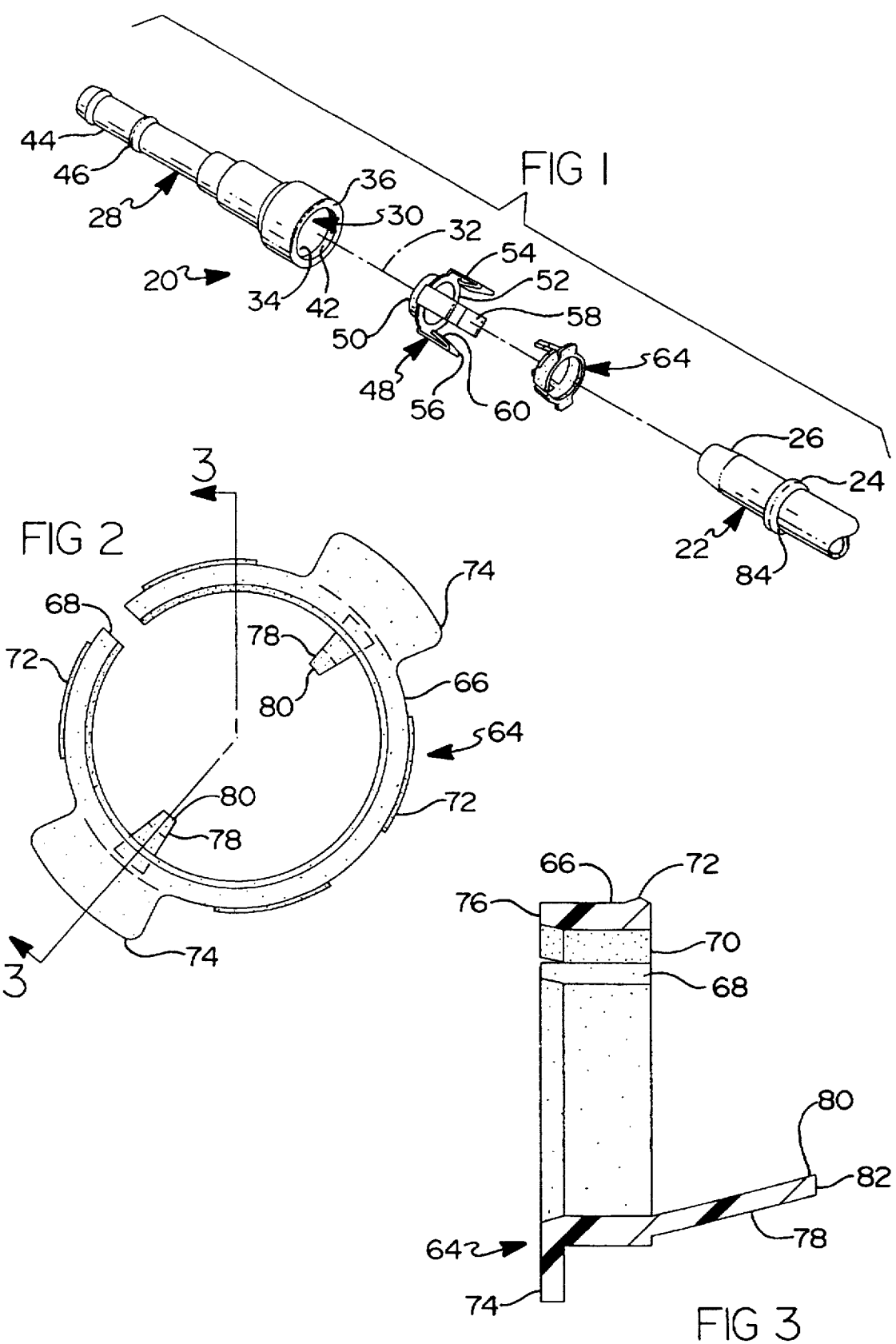

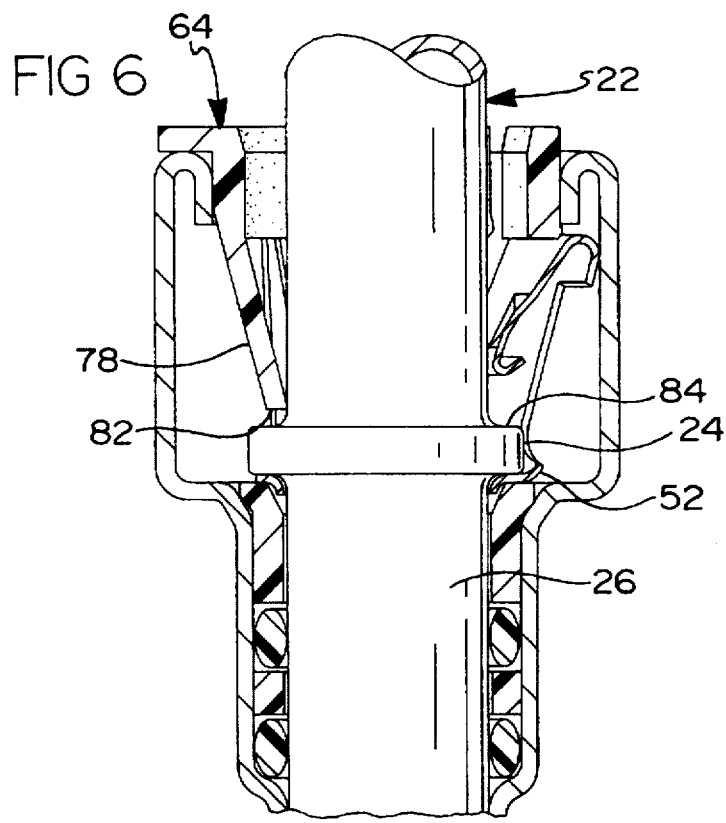
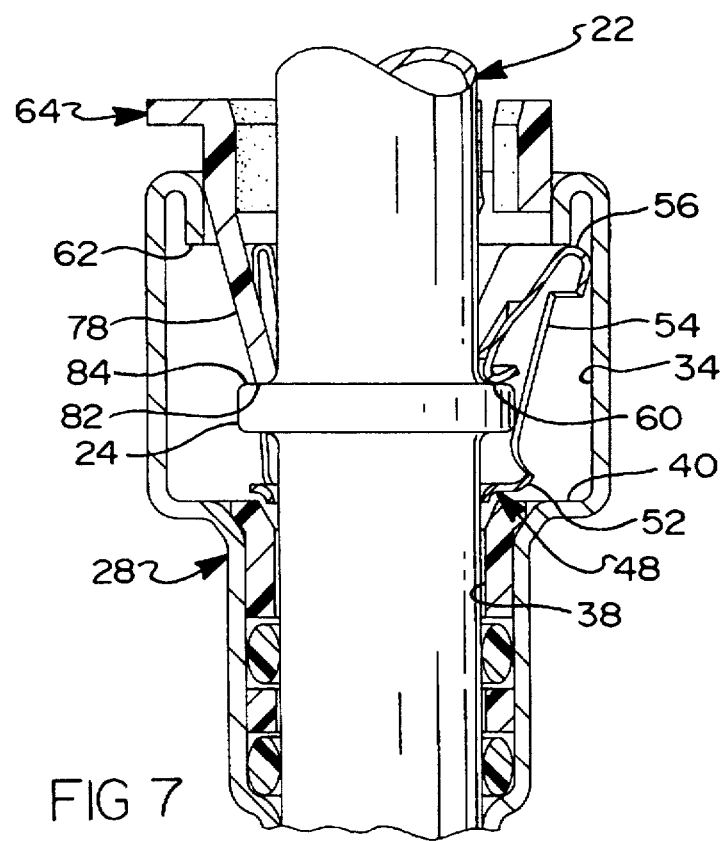

FIG 8
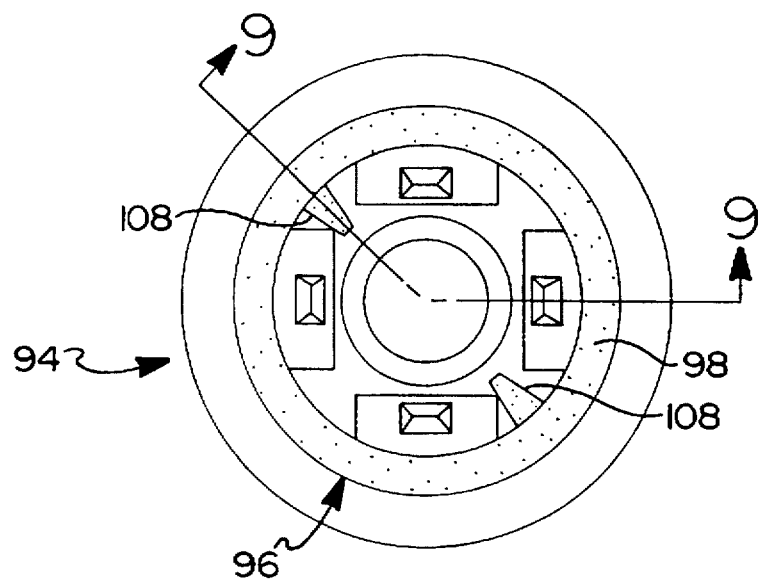
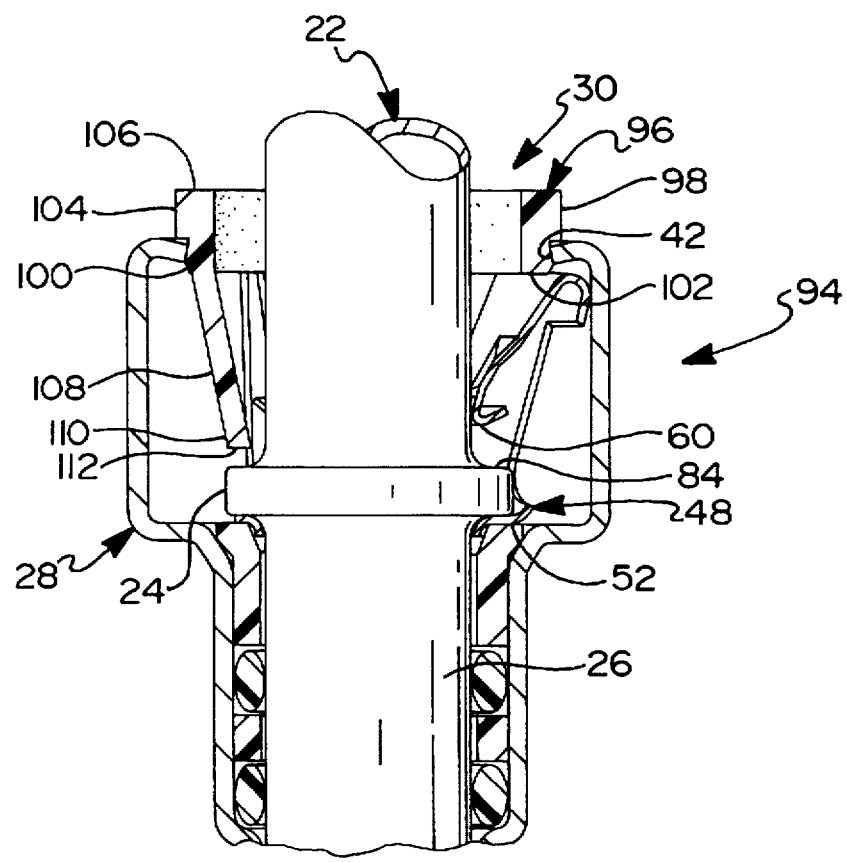
FIG 9

POP OFF INSERTION INDICATOR FOR METAL QUICK CONNECTORS

TECHNICAL FIELD

The invention relates generally to quick connector assemblies which include a male connector component, a female connector component having a complementary bore adapted to sealingly receive the male component, a retainer or locking element engageable with the thus-received male component for locking the male component therein, and an insertion indicator by which completed coupling of male and female components may be visually confirmed. More specifically, the invention relates to axial-release quick connector assemblies featuring an insertion indicator which is ejected from the bore of the female component only after the male component has been inserted therein to a depth sufficient to engage the assembly's retainer, thereby providing visual confirmation of a completed, "locked" connection between the assembly's male and female components.

BACKGROUND OF THE INVENTION

A failure mode of known quick connector assemblies derives from the fact that the assembly's retainer typically cannot operate to lock the assembly's male component within the complementary bore of the assembly's female component unless and until the male component is axially advanced to a minimum depth within the bore. Thus, in circumstances where the amount of axial advancement of the male component into the female component's bore is relatively difficult to observe during quick connector assembly, as is often the case in the crowded environments in which such quick connectors are used, such as the engine bay of an automobile, an assembler may unwittingly fail to advance the male component sufficiently to lock the male component within the female component's bore.

The prior art has responded to this problem by providing an indicator which is insertable into the bore so as to visibly project from the mouth of the bore unless and until it is drawn deeper into the bore through locking engagement of the male component with the retainer inside the bore. However, to the extent that a given quick connector application provides reduced opportunity to directly view the mouth of the bore, such "negative" proof of locking engagement of quick connector components—the absence of a viewable indicator—becomes increasingly less desirable, given that a failure to view an indicator which is still projecting from the mouth of the bore will be treated as "visual confirmation" of a properly locked connector assembly.

Alternatively, the prior art teaches "pop-top" frangible indicators which are insertable within the female component's bore such that a separable portion of the indicator is ejected from within the bore when the male component is fully seated therein, thereby signaling a completed, "locked" connection. Often, the ejected portion of the indicator includes an annular portion which may thereafter be viewed encircling the male component some distance from the quick connector, thereby further serving to provide visual confirmation of a completed, locked coupling, even in highly crowded environments. Unfortunately, the portion or portions of the frangible indicator still retained within the female component's bore by virtue of such locking engagement of the male and female components may later pose problems, for example, by preventing proper insertion of a release tool into the bore, or, upon disassembly of the quick connector, by falling deeper into the bore or otherwise interfering with other adjacent components located within the quick connector's environment.

Thus, what is needed is a quick connector which incorporates the advantages of known "pop-top" indicators while otherwise overcoming the disadvantages inherent to the prior art.

SUMMARY OF THE INVENTION

Under the present invention, an insertion indicator for a quick connector assembly includes an annular base adapted to be received and releasably retained within the mouth of a female connector component's bore, such that the male end form of the connector assembly's male component, including an external flange thereon, is insertable through the indicator's base into the bore. The indicator's annular base preferably includes external projections thereon operative to releasably maintain the indicator's annular base within the mouth of the bore, as well as stop means thereon, such as radially-outwardly extending tabs or a circumferentially-extending external flange, for limiting axial advancement of the indicator into the bore upon insertion of the indicator thereinto. The indicator's base may further include means, such as a radial slot formed therein, for facilitating its resilient radial contraction which, in turn, facilitates releasable retention of the indicator within the mouth of the bore.

In accordance with another feature of the present invention, the insertion indicator further includes at least one and, preferably, at least two legs projecting both axially and radially-inwardly from its base such that, when the indicator is received and releasably retained within the bore, the free end of each leg extends axially deeper into the bore than the "locking" abutment surfaces of a retainer also disposed within the bore. The separational distance between the free ends of the indicator's legs is less than the maximum diameter of the male component's external flange but, preferably, not less than the nominal diameter of the male component immediately adjacent the "back side" of the external flange, i.e., the side of the external flange opposite the male component's mating end.

Additionally, each leg is resiliently radially yieldable so as to permit the male component's external flange to pass through the indicator, whereupon the free end of each leg rebounds radially inwardly thereby to provide an end surface in axial opposition with the back side of the flange. The indicator is thereafter operatively ejected through axial engagement of its with the male component's flange upon slight retraction of the male component from within the bore, with such slight retraction further serving to axially engage the male component's flange with the "locking" abutment surfaces of the retainer.

BRIEF DESCRIPTION OF THE DRAWINGS

Referring to the drawings, wherein like reference numerals are used to designate like elements in each of the several figures, FIG. 1 is an exploded assembly view in perspective of a quick connector assembly embodying the present invention;

FIG. 2 is an enlarged end view of the insert indicator of the quick connector assembly shown in FIG. 1;

FIG. 3 is a longitudinal view in cross-section of the indicator shown in FIG. 1;

FIG. 6 is a longitudinal view in cross-section of the quick connector assembly similar to that of FIG. 5 upon full insertion of the tube's mating end therein;

FIG. 7 is longitudinal view in cross-section of the quick connector assembly similar to that of FIG. 5 upon partial retraction of the tube, whereby the indicator is ejected from the connector body's axial bore thereby to confirm a completed connection;

FIG. 8 is an end view of a partially-assembled assembled quick connector in accordance with the present invention, wherein the "split-ring" indicator of FIGS. 1–7 inserted into the connector body's axial bore has been replaced with an alternate indicator having a fully annular base with modified external projections; and FIG. 9 is a longitudinal view in cross-section of the quick connector of FIG. 8 along line 9—9 thereof upon insertion of the tube's mating end thereinto.

DETAILED DESCRIPTION OF THE PREFERRED EMBODIMENTS

Figure 4:
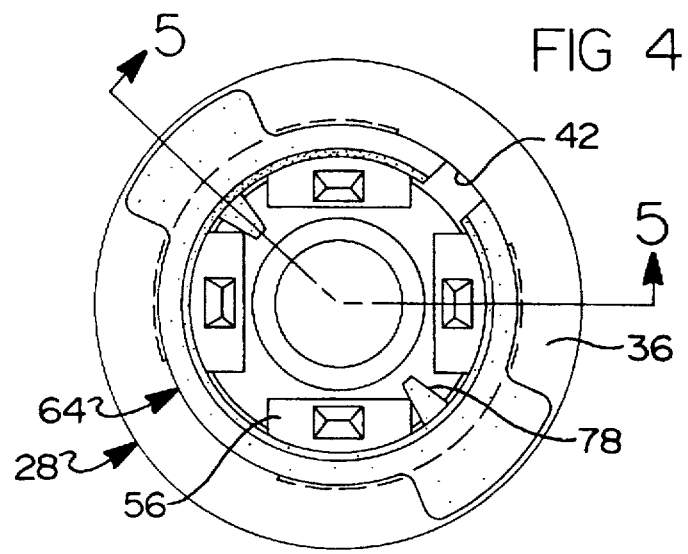
FIG. 4 is an end view of the connector body subsequent to insertion of the retainer and the indicator into its axial bore.

Referring to FIG. 1, a first exemplary quick connector assembly 20 in accordance with the present invention includes as its male connector component a thin-wall metal tube 22 having an upset bead 24 formed proximate to its mating end 26. As its female connector component, the connector assembly 20 includes a tubular connector body 28 having a stepped-radius bore 30 extending longitudinally therethrough along a first axis 32, thereby defining a radially-enlarged end portion 34 proximate to the connector body's mating end 36 for receiving the mating end 26 of the tube 22, including its upset bead 24. As best seen in the cross-sectional view in FIG. 5, the bore 30 further includes a radially-narrowed intermediate portion 38 adapted to receive only the tube's end 26, with the interface between end portion 34 and intermediate portion 38 thereby defining a radial shoulder 40 against which the tube's upset bead 24 is seated upon full insertion of tube 22 into bore 30.

Returning to FIG. 1, the end portion 34 of bore 30 is also provided with a radially-inwardly-extending lip or flange 42 proximate to the connector body's mating end 36, the purpose of which will be described more fully below. The opposite end 44 of the connector body 28 is provided with axially-spaced circumferential retaining flanges 46 adapted to receive and retain a hose (not shown) about its periphery.

Figure 5:
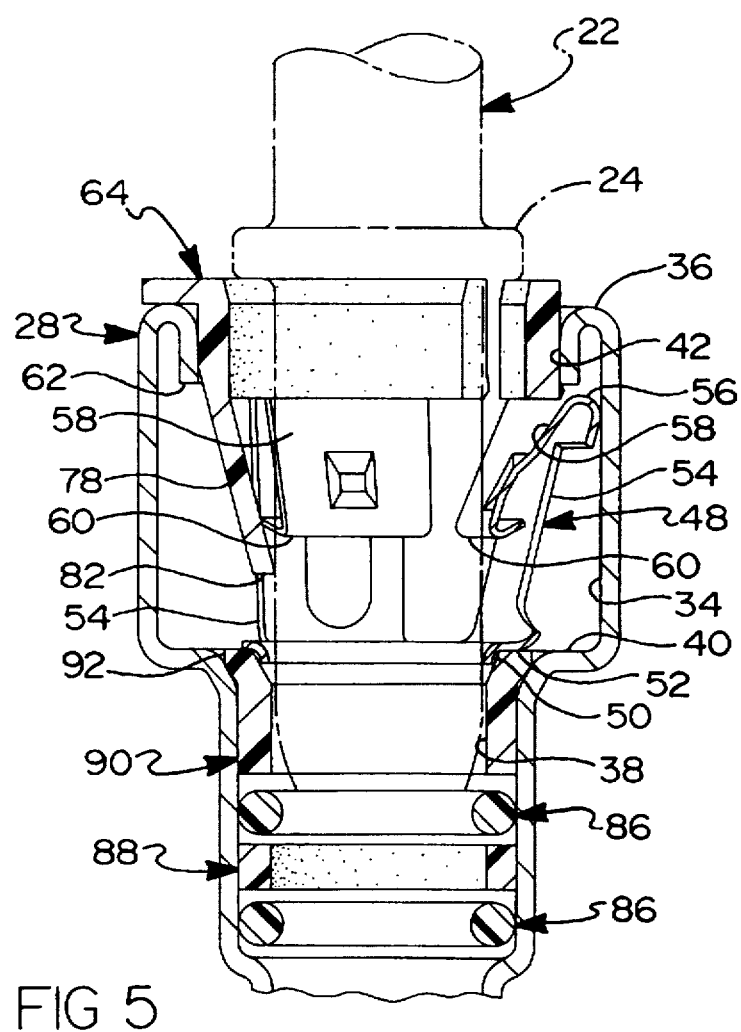
FIG. 5 is a longitudinal view in cross-section of the connector body with its installed retainer and indicator along line 5—5 of FIG. 4, prior to insertion of a male tube end form therein.

The quick connector assembly 20 of FIG. 1 also includes a locking element or retainer 48 adapted to be nestingly received within end portion 34 of the connector body's axial bore 30, which retainer 48 serves to lock the tube 22 within the bore 30 subsequent to proper insertion and advancement of the tube end 26 thereinto. As best seen in FIGS. 1 and 5, the retainer 48, which is formed of a resilient material such as spring steel, includes an annular base 50 adapted to be received within the intermediate portion 38 of bore 30 adjacent its radial shoulder 40 such that a radially-outwardly-extending flange 52 on one end of the retainer's base 50 is seated against radial shoulder 40. The retainer 48 also includes four circumferentially-spaced finger members 54 which are integrally formed with its radial flange 52 and which extend axially therefrom toward the "mouth" of the connector body's bore 30 proximate the body's mating end 36 upon installation of the retainer 48 therein.

As best seen with reference to FIGS. 4 and 5, the free end of each finger member 54 folds back toward the retainer's base 50 at fold 56 to define a ramp surface 58 on its radially-inner surface. The free end of each finger member 54 terminates in a short radially-outwardly-directed leg defining an abutment surface 60 positioned which is axially spaced from the retainer's radial flange 52 by a distance significantly greater than the axial thickness of the tube's upset bead 24.

Upon insertion of the retainer 48 base-first into the connector body's bore 30, the finger members 54 resiliently yield radially-inwardly to permit the insertion of the retainer 48 completely into bore 30 past inner lip 42. When completely inserted into bore 30, the retainer's radial flange 52 seats against the bore's radial shoulder 40 while the fold 56 in each finger member 54 rebounds within the bore's radially-enlarged end portion 34 into axial opposition with the bore's inner lip 42. Meanwhile, the abutment surfaces 60 of the retainer's finger members 54 now define the minimum depth dimension to which the tube's upset bead 24 must subsequently be inserted into bore 30 in order to axially engage abutment surfaces 60 and thereby lock tube 22 within bore 30. In the quick connector assembly 20 illustrated in FIGS. 1–7, the gap between the fold 56 in each of the thus-installed retainer's finger members 54 and the axially-innermost surface 62 of the bore's inner lip 42 is preferably kept relatively small in order to limit post-insertion axial movement of retainer 48 within bore 30.

Returning to FIG. 1, the quick connector assembly 20 further includes an insertion indicator 64 which is adapted to be received and resiliently retained within the mouth of the connector body's bore 30 prior to insertion of the tube's mating end 26 thereinto. As seen in FIGS. 2 and 3, the insertion indicator 64, which may conveniently be formed from a low cost material such as injection molded plastic, includes a generally annular, "split-ring" base 66 having a radial slot 68 formed therein to permit resilient radial contraction of the base 66 upon insertion of its first axial end 70 into the mouth of bore 30. Four circumferentially-spaced circumferentially-extending arcuate projections 72 formed in the base 66 proximate to its first end 70 are adapted to engage the bore's inner lip 42 so as to releasably retain the indicator 64 in the mouth of the bore 30 upon insertion and subsequent resilient radial expansion of the indicator base 66 therein. A pair of diametrically-opposed radially-outwardly-extending tabs 74 on the base's other axial end 76 prevents the indicator 64 from being inserted too far inside bore 30.

As seen in FIGS. 1–3, the indicator 64 further includes two diametrically-opposed legs 78 which extend both axially and radially-inwardly from the first axial end 70 of the base 66 and are integrally formed therewith. And, as seen in FIGS. 4 and 5, upon insertion of the indicator 64 into the mouth of bore 30, the free end 80 of each leg 78 extends axially within bore 30 to a depth therein closer to the retainer's radial flange 52 than abutment surfaces 60, but still axially spaced from the radial flange 52 by a distance slightly greater than the axial thickness of the tube's upset bead 24.

In accordance with the present invention, and as best seen in FIGS. 2 and 4, the indicator's legs 78 extend slightly radially inwardly toward one another relative to its base 66 such that the free ends 80 of the legs 78 are spaced a distance which is somewhat less than the maximum diameter of the tube's upset bead 24 and, preferably, no less than the nominal outer diameter of the tube 22 itself. Moreover, each leg 78 is resiliently radially yieldable so as to permit passage of the tube's upset bead 24 through the indicator 64 when fully inserting the tube's mating end 26 into the connector body's axial bore 30.

Thus, once the tube's upset bead 24 is inserted through the indicator's base 66, past the retainer's ramped and abutment surfaces 58,60 and, ultimately, past the indicator's legs 78, the free end 80 of each leg 78 will rebound radially inwardly thereby to provide an end surface 82 in axial opposition with the back side 84 of the tube's upset bead 24, as shown in FIG. 6 (with FIG. 6 further showing the tube's upset bead 24 fully seated against the radial flange 52 of retainer 48 proximate to the bore's radial shoulder 40). And, as shown in FIG. 7, the indicator 64 may thereafter be operatively ejected from the mouth of bore 30 through axial engagement of the back side 84 of the tube's upset bead 24 with the end surface 82 of each indicator leg 78, as may be achieved by tugging on the tube 22 when otherwise confirming that abutment surfaces 60 on the retainer's finger members 54 have properly rebounded into axial opposition with the back side 84 of the tube's upset bead 24.

Stated another way, in accordance with the present invention, the relative depths of the retainer's abutment surfaces 60 and the free ends 80 of the indicator's legs 78 within bore 30 necessary require that the tube's upset bead 24 be inserted past "locking" abutment surfaces 60 prior to being placed in axial opposition with each leg's end surface 82. Thus, to the extent that the assembler of the quick connector, after first inserting the tube 22 through the indicator base 66 into bore 30, is thereafter able to eject the indicator 64 from bore 30 by tugging back on the tube 22, the assembler is provided with visual confirmation that he has, in fact, inserted tube 22 sufficiently far into bore 30 as to lock the tube's upset bead 24 within bore 30 with retainer 48.

And, in accordance with another feature of the present invention, the indicator's annular base 66 will ensure that the ejected indicator continues to encircle the tube 22 some distance from the quick connector assembly 20, thereby further serving to provide visual confirmation of a completed, locked assembly, even in highly crowded environments, while keeping the ejected indicator 64 secure relative to adjacent components within that environment.

FIG. 7 further illustrates the slight axial displacement of the retainer 48 away from the radial shoulder 40 of the bore 30 which may permissively occur when otherwise tugging on the tube 22 to eject the indicator 64 from bore 30. Indeed, such slight axial movement of the retainer 48 may be advantageously used to facilitate ejection of indicator 64 from bore 30 as by effecting slight radial contraction of the indicator's base 64 proximate its first axial end 70 with ramped surface 58 of finger members 54.

FIGS. 5–7 further illustrate an exemplary sealing means disposed within the radially-narrowed portion 38 of the connector body's axial bore 30. The sealing means includes a pair of O-rings 86, as separated by an annular bushing 88 and secured within the bore's intermediate portion 38 by a top-hat bushing 90. The top-hat bushing 90 also provides the bore's intermediate portion 38 with a chamfered leading edge within which to receive the annular base 50 of retainer 48. The top-hat bushing's enlarged annular portion 92 thus cooperates with adjacent radially-extending portions of bore 30 to define the radial shoulder 40 against which the retainer's radial flange 52 and the tube's upset bead 24 are sequentially seated upon assembly of the quick connector 20. Indeed, in a preferred embodiment, the retainer 48 itself maintains the top-hat bushing 90 within the intermediate portion 38 of bore 30. Upon inserting the tube 22 into bore 30, the O-rings 86 radially engage the tube's mating end 26 to provide a fluid-tight seal between the tube 22 and the connector body 28.

A quick connect assembly 94 in accordance with the present invention incorporating an alternate indicator 96 is shown in FIGS. 8 and 9. As with the indicator 64 described hereinabove in connection with FIGS. 1–7, indicator 96 includes a generally annular base 98 which is adapted to be received and releasably retained within the mouth of the connector body's axial bore 30 prior to insertion of the tube's mating end 26 thereinto. In contrast with the first indicator 64, whose base 66 is provided with a radial slot 68 facilitating its resilient radial contraction upon insertion of indicator 64 into bore 30, the alternate indicator's base 98 is fully annular and, hence, must rely more heavily on its material's natural resiliency, as well as a modified circumferentially-extending bead 100 projecting radially-outwardly from its first axial end 102 and engageable with the bore's inner lip 42, to securely and yet releasably retain indicator 96 within the mouth of bore 30. A radially-outwardly-extending flange 104 on the indicator base's other axial end 106 prevents indicator 96 from being inserted too far inside bore 30.

As with indicator 64, indicator 96 likewise includes a pair of diametrically-opposed legs 108 which extend both axially and radially-inwardly from the first axial end 102 of the base 98 and are integrally formed therewith. Thus, upon insertion of indicator 96 into the mouth of bore 30, the free end 110 of each leg 108 extends axially within bore 30 to a depth therein closer to the retainer's radial flange 52 than its abutment surfaces 60, but still axially spaced from the radial flange 52 by a distance slightly greater than the axial thickness of the tube's upset bead 24.

And, as with indicator 64, the legs of indicator 96 extend slightly radially inwardly toward one another relative to its base 98 such that their free ends 110 are spaced a distance somewhat less than the maximum diameter of the tube's upset bead 24 and, preferably, no less than the nominal outer diameter of the tube 22 itself. Each leg 108 is resiliently radially yieldable so as to permit passage of the tube's upset bead 24 through the indicator base 98 and past its legs 108 when fully inserting the tube's mating end 26 into the connector body's axial bore 30, whereupon the free end 110 of each leg 108 will rebound radially inwardly thereby to provide an end surface 112 in axial opposition with the back side 84 of the tube's upset bead 24, as shown in FIG. 9. Indicator 96 may thereafter be ejected from bore 30 upon slight axial retraction of the tube 22 through axial engagement of the back side 84 of the tube's upset bead 24 and the end surfaces 112 of the indicator's legs 108, thereby to provide visual confirmation of a properly coupled connector assembly.

While the preferred embodiments of the invention have been disclosed, it should be appreciated that the invention is susceptible of modification without departing from the spirit of the invention or the scope of the subjoined claims. For example, while the quick connector assemblies illustrated herein are adapted for application within systems employing tubular conduit, it is contemplated that the present invention could be employed with other structural configurations and applications.

We claim:

1. An indicator for providing visual confirmation of a completed coupling of a male component of a connector assembly with a female component of the connector assembly, wherein the male component includes a mating end with an external flange and the female component includes an axial bore defined therein adapted to receive the male component's mating end, the connector assembly further including a retainer means disposed within the bore of the female component for retaining the male component within the bore once the flange thereof is advanced to a first predetermined depth within the bore, said indicator comprising:

an annular base having a central passage for passing the male component through said base and wherein said indicator is adapted to be releasably retained within the bore through radial engagement of said base with the bore; and at least one leg projecting axially from said base, for directly engaging the flange of the male component at a second depth geater than the first depth.

2. The indicator of claim 1, wherein the base includes a radial slot formed therein to facilitate resilient radial contraction of the base.

3. The indicator of claim 1, including stop means on the base.

4. The indicator of claim 3, wherein the stop means includes a plurality of radially-outwardly-extending tabs on said base, each tab defining an axially-disposed surface for engaging a surface of the female component upon insertion of said indicator into the bore.

5. The indicator of claim 1, wherein said at least one leg further projects radially inwardly from the base for resiliently radially engaging the flange of the male component.

6. A connector assembly, comprising:

a male component, a female component, wherein the male component includes a mating end with an external flange, and wherein the female component includes a bore defined therein along an axis adapted to receive the mating end of the male component, retainer means located within the bore of the female component and engageable with the flange on the male component for retaining the male component within the bore of the female component when the flange is inserted to a first predetermined depth within the bore, an indicator having an annular base adapted to be received within the bore of the female component so as to be releasably retained therein; and a leg projecting from the annular base such that a first surface on the leg extends axially to a second predetermined depth within the bore greater than said first depth therein when said indicator is releasably retained therein, the first surface of the leg being axially opposed to the flange of the male component when said indicator is releasably retained within the bore and the male component is inserted into the bore so as to insert the flange thereof to at least said second depth, wherein said base of said indicator is released from the bore as the first surface of the leg is axially displaced from said second depth within the bore toward said first depth therein.

7. The indicator of claim 6, wherein the base is resiliently radially engageable with the bore upon insertion of said indicator thereinto.

8. The indicator of claim 7, wherein the base includes a radial slot formed therein to facilitate resilient radial engagement of the base with the bore.

9. The indicator of claim 6, wherein the base projects axially from within the bore when said indicator is releasably retained therein.

10. The indicator of claim 6, including stop means on the base axially engageable with a second surface of the female component upon insertion of said indicator into the bore.

11. The indicator of claim 10, wherein the stop means includes a plurality of radially-outwardly-extending tabs on the base, each tab defining a third axially-disposed surface engageable with the second surface of the female component upon insertion of said indicator into the bore.

12. The indicator of claim 6, wherein each leg further projects radially inwardly from the base to resiliently radially engage the flange of the male component upon insertion of the male component through said indicator.

13. The indicator of claim 6, wherein the retainer means within the bore includes a plurality of axially-extending members, each of the members defining an abutment surface which is axially engageable with the flange of the male component when the flange of the male component is inserted to said first depth within the bore thereby to retain the male component within the bore; and wherein the leg of said indicator is interdigitated with the finger members of the retainer means upon insertion of said indicator into the bore.

14. An indicator for providing visual confirmation of a completed coupling of a male component of a connector assembly with a female component of the connector assembly, wherein the male component includes a mating end with an external flange and the female component includes an axial bore defined therein adapted to receive the male component's mating end, the connector assembly further including a retainer means disposed with in the bore of the female component for retaining the male component within the bore once the flange thereof is advanced to a first predetermined depth within the bore, said indicator comprising:

an annular base having a central passage for passing the male component through said base;

at least one leg projecting axially from said base, for directly engaging the flange of the male component; and stop means on said base including a plurality of radially-outwardly-extending tabs on said base, each tab defining an axially-disposed surface for engaging a surface of the female component upon insertion of said indicator into the bore.

* * * * *